(Model.)
A. P. LARSSON.
HORSE DETACHER.
No. 290,072. Patented Dec. 11, 1883.
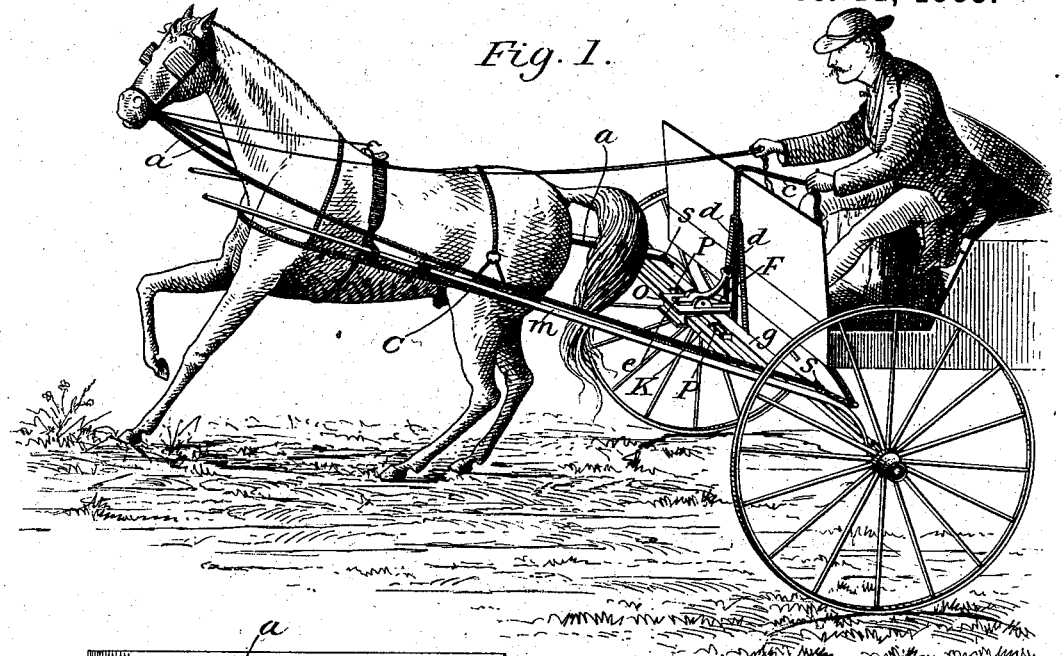
Fig. 1.
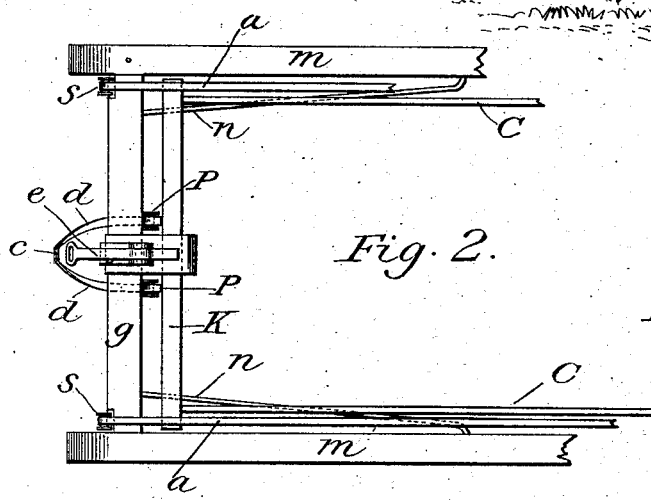
Fig. 2.
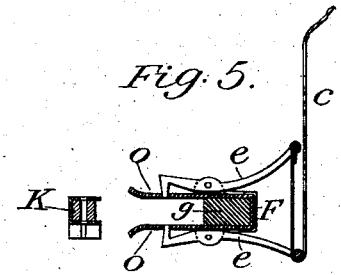
Fig. 5.
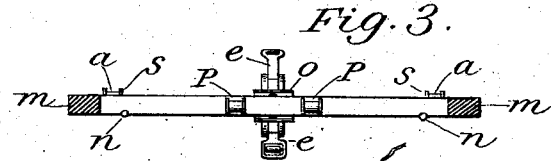
Fig. 3.
Fig. 4.
Witnesses:
Sam Fox
Inventor:
Albert P. Larsson

UNITED STATES PATENT OFFICE.

ALBERT P. LARSSON, OF OMAHA, NEBRASKA.

HORSE-DETACHER.

SPECIFICATION forming part of Letters Patent No. 290,072, dated December 11, 1883.

Application filed July 28, 1883. (Model.)

*To all whom it may concern:*

Be it known that I, ALBERT P. LARSSON, a citizen of the United States, residing at Omaha, in the county of Douglas and State of Nebraska, have invented a new and useful Mode of Preventing Horses from Running Away; and I do hereby declare that the following is a full, clear, and exact description thereof, reference being had to the accompanying drawings, and to the letters of reference marked thereon, making a part of this specification, in which—

Figure 1 is a perspective view, Fig. 2 a plan, Fig. 3 a rear elevation, and Figs. 4 and 5 cross-sections, of my device.

$g$ is the cross-piece, to which the single-tree is generally attached. K is the single-tree. $m\ m$ are the shafts. $o$ is the clamp. $a\ a$, $c$, and $d\ d$ are straps. C C are the traces. P P and $s\ s$ are rollers. $e\ e$ are levers. F is a spring. $n\ n$ are iron rods.

The nature of my invention consists in a detachable single-tree, with straps attached in such a manner as to transfer the strain of draft from the traces to straps attached to the bit when the horse attempts to run away; and to enable others skilled in the art to make and use my invention, the following description of its construction and operation is submitted.

Instead of the ordinary mode of connecting the single-tree K with the cross-piece $g$, I employ for that purpose a metallic clamp or open band, $o$, which is fastened to cross-piece $g$, the open ends extending sufficiently far forward to admit the single-tree K. The clamp $o$ is provided with two levers, $e\ e$—one above and one beneath—the forward ends of which are so constructed as to take the place and serve the purpose of the bolt ordinarily employed to hold the single-tree in place. The levers $e\ e$ are kept in position to hold the single-tree by a spring, F. Strap $c$ is attached to and extends from the upper lever $e$ through a ring or roller in the end of the lower lever $e$, and thence to a position accessible by the driver. Straps $d\ d$ are attached to the single-tree K, and pass over rollers P P and under cross-piece $g$ to strap $c$, to which they are fastened. Straps $a\ a$ are attached to cross-piece $g$, passing over rollers $s\ s$ to the bit in the horse's mouth.

Generally and in ordinary use the single-tree K is held in place by levers $e\ e$; but in case the horse attempts to run away I employ strap $c$ to open levers $e\ e$, and allow the single-tree to slide forward on iron rods $n\ n$, and when the horse pulls forward on traces $b\ b$ the strain is transferred to straps $a\ a$, which throws the weight usually drawn by the traces upon the horse's mouth, and thus prevents his becoming unmanageable.

When the horse is under control, the single-tree is drawn back into place by straps $d\ d$, (the levers $e\ e$ being opened by the same motion,) and by allowing strap $c$ to slacken, the single-tree is caught and held in place by levers $e\ e$, as described.

What I claim as my invention, and desire to secure by Letters Patent, is—

The attachment to one-horse vehicles of a metallic clamp or open band, with levers so constructed as to allow the detachment of single-trees, substantially as described, and iron rods, upon which the single-tree rests while so detached, and the manner of operating the same with straps, springs, and rollers, as herein set forth, for the purpose of preventing or restraining horses from running away, as herein described, using for that purpose the aforesaid contrivance and materials, or any other substantially the same and which will produce the intended effect.

In testimony whereof I have affixed my signature, at Omaha, Nebraska, this 24th day of July, 1883.

ALBERT P. LARSSON.

In presence of—
 MOSES P. O'BRIEN,
 ED FITCH.